Dec. 26, 1939.  M. MALLORY  2,184,357
INTERNAL COMBUSTION ENGINE
Filed May 4, 1938

Inventor
Marion Mallory
E. N. Lovewell

By

Attorney

Patented Dec. 26, 1939

2,184,357

UNITED STATES PATENT OFFICE 2,184,357

INTERNAL COMBUSTION ENGINE

Marion Mallory, Detroit, Mich.

Application May 4, 1938, Serial No. 206,052

10 Claims. (Cl. 123—32)

This invention relates to new and useful improvements in an internal combustion engine of the type which comprises a primary firing pocket from which an electrically ignited charge is projected into the main combustion chamber at the upper end of the cylinder to ignite the charge therein. Thus a low grade fuel may be used for the main charge with the assurance that it will be properly ignited. This main fuel charge is usually injected in liquid form when the piston is near the end of its compression stroke.

In engines of this type as heretofore constructed, the outlet from the firing pocket terminates at the wall surface of the main combustion chamber or in a recess of said chamber. The main fuel charge, especially if it is injected, is apt to condense around the surface of the combustion chamber and piston head, so that it is too rich to be readily ignited and burned, and I have found that if the projected flame emerges at a point adjacent to such surfaces, the ignition is very erratic, the explosion is not smooth and the detonation is bad.

One object of the invention is to eliminate this difficulty by extending the outlet nozzle from the firing pocket to a point near the center of the main combustion chamber. Thus the combustion of the main charge begins at the center, at a point where there are no cold surfaces to cause condensation, and progresses in all directions. This insures complete and uniform combustion.

It is a further object of the invention to prevent condensation against the walls of the ignition pocket by providing a restriction or venturi between the inlet valve and the spark gap, thereby directing the atomized charge toward the center of the pocket.

A further object of the invention is to provide means whereby the engine idles on an atomized charge drawn directly from the carburetor into the main combustion chamber, and when the throttle is opened, air alone is drawn into said chamber and supplemented by an injection of fuel oil.

A still further object of the invention is to arrange the throttle valves so as to delay the opening of the air inlet to the main combustion chamber, when the throttle is opened, thus maintaining suction through the inlet to the firing pocket to aid acceleration.

The above and other objects of the invention and the means by which they are attained will be more fully explained in connection with the accompanying drawing, in which—

Figure 1:
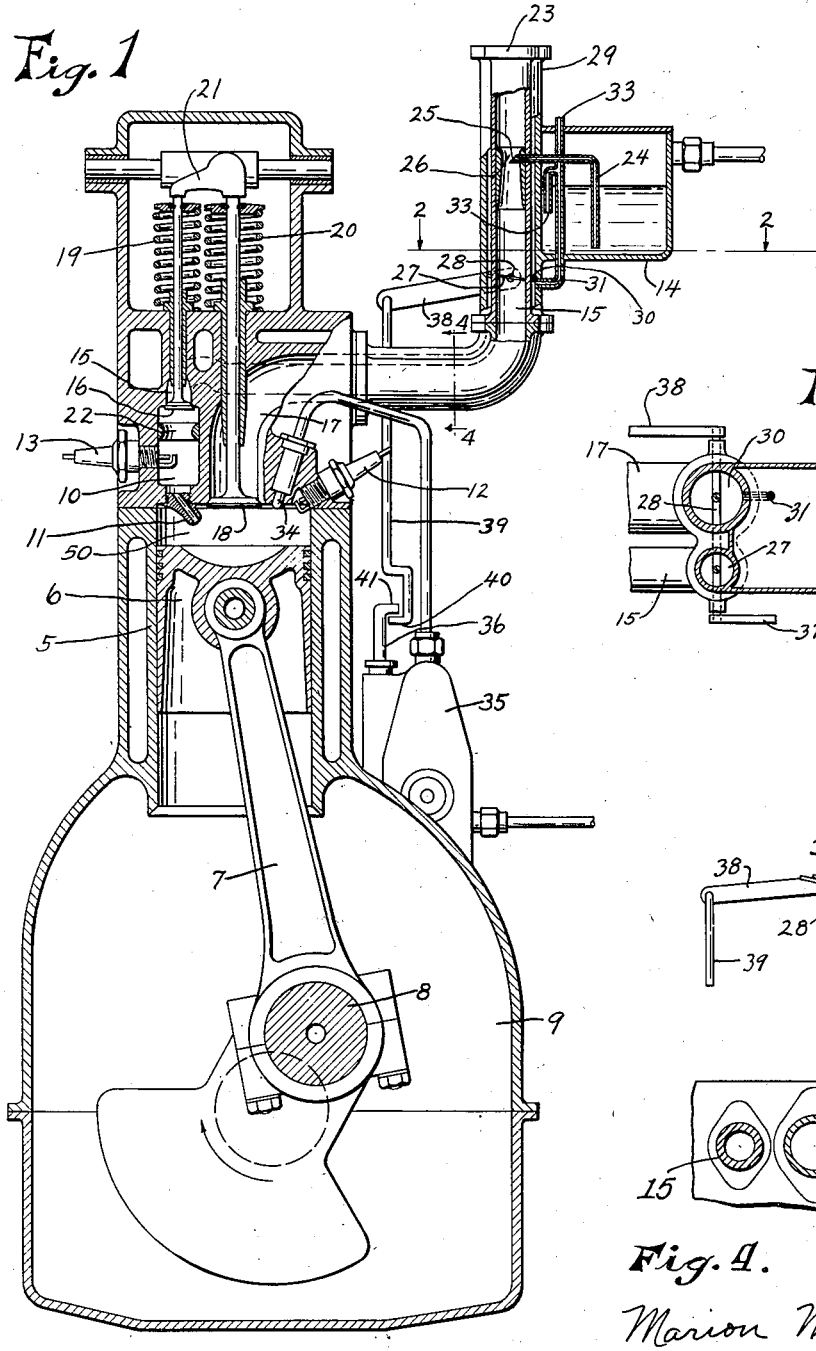
Fig. 1 is a section taken centrally of one of the engine cylinders and showing the charge forming devices partly in section and partly in elevation.
Figure 2:
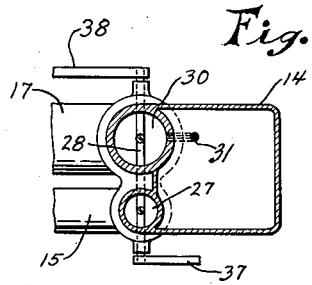
Fig. 2 is an enlarged section taken on the line 2—2 of Fig. 1.

The drawing shows one of the engine cylinders 5, in which a piston 6 is reciprocable by means of a piston rod 7 connected with a crank shaft 8 operating in the usual manner in a crank case 9. It is to be understood that the engine may have any desired number of such cylinders. The main combustion chamber 50 is directly above the piston 6 and a primary firing pocket 10 communicates therewith through a restricted nozzle 11, which projects into the main combustion chamber and terminates near the center thereof. The main combustion chamber and the firing pocket are provided with spark plugs 12 and 13 respectively.

Fuel mixture is supplied to the primary firing pocket 10 from a carburetor 14 through an intake passage 15, the admission of such mixture to the pocket being controlled by an intake valve 16. The main combustion chamber 50 is provided with an air intake 17 controlled by an intake valve 18, and under certain operating conditions, as hereinafter explained, this intake also may deliver a carburetted mixture. It will be understood that the main combustion chamber is exhausted in the conventional manner, but it is not necessary to provide an exhaust port for the pocket 10 because the residual gases left therein will be a negligible factor in the operation of the engine.

The intake valves 16 and 18 are held normally closed by springs 19 and 20 respectively and are adapted to be opened simultaneously by a rocker arm 21, which is operated in the usual manner. It has been found that the valve 16 tends to deflect the fuel mixture against the walls of the pocket 10, and this might at times cause condensation. It is desirable, therefore, to provide a restriction or small venturi 22 between the valve 16 and the spark plug 13. This deflects the mixture back toward the center of the pocket and speeds up its flow, thus producing better atomization of the primary firing charge in the vicinity of the spark plug and a consequent improvement in ignition.

The mixture passage 15 leading to the ignition pocket 10 has an air intake 23. A fuel conduit 24 leading from the bowl of the carburetor 14 terminates in a nozzle 25 within a venturi 26 with which the passage 15 is provided. A throttle valve 27 secured to a shaft 28 is located within the passage 15 on the engine side of the venturi 26.

Figure 3:
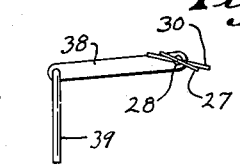
Fig. 3 is an enlarged detail view of the throttle valves, showing their positions with relation to each other.
Figure 4:
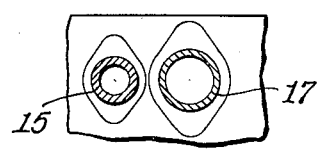
Fig. 4 is a section along the line 4—4 of Fig. 1.

The passage 17 has an air intake 29 and a throttle valve 30 within this passage is secured to the shaft 28. Thus both valves 27 and 30 are secured to the same shaft. As shown particularly in Fig. 3, these valves are so disposed that the opening of the valve 30 will not be as much, measured in degrees, as that of the valve 27, for a purpose hereinafter explained. A fuel tube 31 opens into the passage 17 just below the valve 30 and has an intake 32 from the carburetor bowl and an air bleed 33, so that fuel mixture, rather than air alone, may be supplied directly to the main combustion chamber when the throttle is set for idling or very low speed.

For high speed or power operation, a charge of liquid fuel is supplied to the main combustion chamber through an injector 34 from a pump 35 and the quantity injected is controlled by a metering pin 36. The throttle valve shaft 28 is provided with an actuating arm 37 and also with an arm 38 which carries a depending dog 39 having a lip 40 disposed beneath a corresponding lip 41 on the upper end of the metering pin. It will be understood, therefore, that the injection metering pin is normally closed until the throttle is opened to a predetermined extent. Then, as the throttle is opened wider, the metering pin begins to open. The metering pin also closes in advance of the throttle.

In the operation of this engine, both throttle valves 27 and 30 and the metering pin 36 are moved in unison except at the beginning of the throttle opening; that is, each of these elements always has a definite relation to the others. With the throttle partly or wholly open, air alone is drawn into the cylinder through the passage 17 and the metering pin is positioned to deliver a proportional amount of fuel through the injector 34. At the same time, a firing charge of fuel mixture is delivered through the passage 15 to the firing pocket 10. As above explained, the small venturi 22 is very useful in perfecting the atomization of the firing charge in the vicinity of the spark plug 13.

It is well known that fuel, especially heavy fuel, regardless of how well it is atomized by carburetion or injection, immediately condenses when it contacts with the surfaces of piston heads, cylinder heads or cylinder walls, and I have found that if the ignition chamber outlet terminates close to these metal surfaces, where the mixture is rich and difficult to ignite, the ignition is very erratic. The engine will miss some explosions, causing excessive smoke and dilution of engine lubrication. I have also found that even if it were possible to eliminate misfiring, the combustion would be very poor if it were started at a point close to metal surfaces where condensation takes place, because the combustion starts in a rich mixture, burns through a lean mixture and finishes up in a rich mixture.

I have overcome these difficulties by terminating the outlet of the ignition pocket at or near the center of the main charge, so that the combustion of the latter starts at or near the center thereof and burns toward the metal surfaces or areas having a rich mixture. The combustion, then, is started where the mixture is more uniform and not too rich. Naturally, the heat generated by the burning of the uniform mixture will completely burn the rich mixture contiguous to the metal surfaces. By terminating the outlet from the firing chamber at or near the center of the main charge and away from metal surfaces, misfiring and smoking are eliminated. The combustion is complete and this also eliminates dilution of the engine lubrication.

At this point it may be noted that if the rotation of the crank shaft is clockwise, as shown in Fig. 1, the cylinder is offset to the left of the crank shaft center. As a result, the increase in volume of the combustion chamber will be more rapid at the beginning of the downward stroke, but not so rapid toward the end of the stroke. This is especially desirable for high compression engines using flame for ignition, which causes rapid expansion, because the rapid movement of the piston immediately after combustion starts, expands the combustion chamber and this prevents undue rise in pressure which would cause detonation.

For idling, both valves 27 and 30 are substantially closed and the fuel mixture charge is supplied through the idle jet 31 to the intake passage 17 on the engine side of the throttle valve 30. The spark plug 12 is mainly for the purpose of igniting this charge. In closing the throttle, the valves 27 and 30 and the metering pin 36 all move in unison until the metering pin is completely closed, after which the valves have some further movement. Injection for idling has never been satisfactory because of difficulties in making the pump delicate enough. If the holes in the injector were made large enough to admit fuel for full power, fuel for idling would be admitted at such low velocity that it would not be atomized. This would cause smoking, poor combustion and many disadvantages resulting therefrom.

It is also unsatisfactory to use a fuel mixture charge in the pocket 10 for idling, while nothing but air is supplied through the intake to the main combustion chamber. Under such conditions the mixture in the pocket must be rather rich and because of its substantial segregation from the air in the main combustion chamber, a great deal of carbon monoxide comes out of the exhaust.

It will be noted that the orifice of the idle jet 31 is immediately below the throttle valve on the side opposite to its location in the usual carburetor. In other words, it is located so that it will be on the atmospheric side of the throttle valve as soon as the latter is opened slightly. This causes a rapid fade-out of the idling charge as an increasing charge of fuel mixture is drawn through the venturi 26 into the firing pocket and the flame therefrom used to ignite the mixture formed by injection in the main combustion chamber. As stated above, the metering pin on the injector pump starts to open only after the throttle valves are partly open and closes before they close. In other words, the injector is inoperative at idle and, controlled by the metering pin, functions as a power jet when the throttle is moved away from idling position.

As the throttle is opened and fuel ceases to flow from the idling jet 31, the injection into the main combustion chamber begins and fuel then starts to flow out of the nozzle 25 into the pocket 10. Due to the fact that the valve 27 is set at a different angle from that of valve 30, valve 27 opens its passage more quickly than valve 30 when accelerating. This maintains a vacuum in the cylinder, which in turn increases the air flow through the venturi 26, thereby insuring a continuous and smooth change from idling to power operation.

While I have explained in detail one embodiment of the invention, it is to be understood that I do not desire to limit the invention to injection. In other words, the extension of the outlet from the firing pocket is very desirable when carburetted mixtures are used.

I claim:

1. An internal combustion engine comprising a cylinder with a main combustion chamber, means for supplying a combustible charge to said chamber, a primary firing pocket provided with electric ignition, means for supplying a carburetted charge to said pocket, and a restricted outlet from said pocket into the main combustion chamber including a nozzle projecting beyond the wall of said chamber toward the center thereof, whereby ignition in the pocket projects a flame into said chamber causing combustion of the main charge to begin near the center of said chamber.

2. An internal combustion engine comprising a cylinder with a main combustion chamber, means for supplying a combustible charge to said chamber, a primary firing pocket provided with a spark plug and having an intake port, means for supplying a carburetted charge through said intake port to the firing pocket, a venturi between said intake port and the spark plug to direct the carburetted charge toward said plug, and a restricted outlet from said pocket into the main combustion chamber, whereby the flame resulting from the primary ignition ignites the main charge.

3. An internal combustion engine comprising a cylinder with a main combustion chamber, a primary firing pocket having a restricted outlet into said chamber, separate intake passages for said chamber and pocket respectively, a throttle valve in each intake passage, means for supplying carburetted mixture through the intake passage to said chamber when its throttle valve is in idling position and supplying air alone for other throttle positions, means for supplying only a carburetted mixture through the intake passage to said pocket, a liquid fuel injector for said combustion chamber, a metering pin for said injector, and synchronized means for opening the metering pin and the two throttle valves.

4. An internal combustion engine comprising a cylinder with a main combustion chamber, a primary firing pocket having a restricted outlet into said chamber, separate intake passages for said chamber and pocket respectively, a throttle valve in each intake passage, means for supplying carburetted mixture through the intake passage to said chamber when its throttle valve is in idling position and supplying air alone for other throttle positions, means for supplying only a carburetted mixture through the intake passage to said pocket, a liquid fuel injector for said combustion chamber, a metering pin for said injector, and means for first opening the two throttle valves slightly while the metering pin remains closed and thereafter opening the metering pin and the two valves in proportionate degree.

5. An internal combustion engine comprising a cylinder with a main combustion chamber, a primary firing pocket having a restricted outlet into said chamber, separate intake passages for said chamber and pocket respectively, a throttle valve in each intake passage, said valves being rigidly connected to a common shaft, means for supplying carburetted mixture through the intake passage to said chamber when its throttle valve is in idling position and supplying air alone for other throttle positions, means for supplying only a carburetted mixture through the intake passage to said pocket, a liquid fuel injector for said combustion chamber, a metering pin for said injector, and a lost motion connection between the valves and the metering pin permitting the valves to open slightly while the metering pin remains closed and causing the metering pin to open in synchronism with a further opening of the valves.

6. An internal combustion engine comprising a cylinder with a main combustion chamber, a primary firing pocket having a restricted outlet into said chamber, said pocket and chamber each having an intake passage with a throttle valve therein, said valves being connected to each other for simultaneous operation, an idle jet supplying a carburetted idling charge to the passage leading to said chamber when the throttle valves are in idling position, said idle jet becoming inoperative when the throttle valves are opened, an injector to supply fuel to said chamber, and means to supply carburetted mixture to said pocket, said injector and the last mentioned means being operative only when the throttle valves are open.

7. An internal combustion engine comprising a cylinder with a main combustion chamber, a primary firing pocket having a restricted outlet into said chamber, a passage leading to said chamber and having an air intake, a throttle valve in said passage, an idle jet opening into said passage on the engine side of said valve when the latter is closed and adjacent the valve sector which moves inwardly when the throttle is opened, thus quickly putting the idle jet on the atmospheric side to cause quick fade-out and a supply of air alone to the main combustion chamber, a liquid fuel injector for the main combustion chamber, an intake passage to the firing pocket, and means for supplying fuel through the injector and carburetted mixture to the pocket, both in proportion to the throttle opening as the idle jet fades out.

8. An internal combustion engine comprising a cylinder with a main combustion chamber, a primary firing pocket having a restricted outlet into said chamber, an intake passage to said pocket having an air inlet and a venturi with a fuel inlet, a throttle valve on the engine side of said venturi, an air supply passage for the main combustion chamber having a throttle valve therein and an idle jet on the engine side thereof to supply an idling charge to said chamber when the throttle valves are closed, said valves being connected for simultaneous operation with the throttle valve to the main combustion chamber always open less than the other valve, whereby to maintain the suction through the pocket and to supply mixture thereto as the idle jet fades out, and an injector supplying liquid fuel to the main combustion chamber only when the throttle valves are opened for partial or full power.

9. An internal combustion engine comprising a cylinder with a main combustion chamber, means for supplying a combustible charge of fluid to said chamber, a primary firing pocket provided with ignition means, means for supplying a combustible charge of fluid to said pocket, and a restricted outlet from said pocket into said main combustion chamber including a nozzle projecting a substantial distance into the chamber and having its outlet directed toward the center of the chamber whereby upon ignition of the combustible charge in the pocket a flame is projected by the nozzle into the center of the combustion chamber where the better combustible mixture is present causing combustion to begin near the center of the said main combustion chamber.

10. An internal combustion engine comprising a cylinder with a main combustion chamber, a valve controlled port through which air is supplied to the combustion chamber, means including a nozzle for injecting liquid fuel into the main combustion chamber, a primary firing pocket provided with ignition means, means for supplying a combustible charge of fluid to said pocket, and a restricted outlet from the said pocket into the main combustion chamber including a nozzle projecting a substantial distance into the chamber and having its outlet directed toward the center of the chamber, said projecting nozzle being spaced from the injector nozzle and the air inlet port whereby the air and liquid fuel is mixed preparatory to meeting and being ignited by the flame projected from the nozzle into the center of the combustible charge in the main combustion chamber.

MARION MALLORY.